United States Patent
Iwai et al.

[11] Patent Number: 6,155,370
[45] Date of Patent: Dec. 5, 2000

[54] FRONT SUSPENSION DEVICE

[75] Inventors: Toshiyuki Iwai; Shinji Ito; Shinichi Yamada, all of Saitama, Japan

[73] Assignee: Honda Giken Kogyo Kabushiki Kaisha, Tokyo, Japan

[21] Appl. No.: 09/158,573

[22] Filed: Sep. 22, 1998

[30] Foreign Application Priority Data

Sep. 23, 1997 [JP] Japan ................................. 9-276406
Sep. 23, 1997 [JP] Japan ................................. 9-276408

[51] Int. Cl.$^7$ .................................................. B62K 25/04
[52] U.S. Cl. .......................... 180/222; 180/219; 280/276; 280/277
[58] Field of Search .................................. 180/222, 219; 280/276, 277

[56] References Cited

U.S. PATENT DOCUMENTS

| | | | |
|---|---|---|---|
| 443,266 | 12/1890 | Bell | 280/277 |
| 444,639 | 1/1891 | O'Neill | 280/277 |
| 1,203,927 | 11/1916 | Stagni | 180/222 |
| 1,254,798 | 1/1918 | Harley | 280/277 |
| 1,365,524 | 1/1921 | Mellantine | 280/277 |
| 1,432,376 | 10/1922 | Wolff | 280/277 |
| 2,038,011 | 4/1936 | Spiegler et al. | 208/101 |
| 2,751,991 | 6/1956 | Mennesson | 180/222 |
| 4,421,337 | 12/1983 | Pratt | 280/277 |
| 4,422,662 | 12/1983 | Inoue et al. | 280/276 |
| 4,723,621 | 2/1988 | Kawano et al. | 180/219 |
| 4,775,163 | 10/1988 | McGowan et al. | |
| 5,026,083 | 6/1991 | Wendorf | 280/277 |
| 5,060,961 | 10/1991 | Bontrager | 280/279 |
| 5,165,712 | 11/1992 | Fuller | 280/277 |
| 5,186,274 | 2/1993 | Hegman | 180/227 |
| 5,299,820 | 4/1994 | Lawwill | 280/277 |
| 5,330,028 | 7/1994 | Handa et al. | 180/219 |
| 5,429,380 | 7/1995 | Lawwill | 280/277 |
| 5,431,426 | 7/1995 | Ijams et al. | 280/276 |
| 5,743,547 | 4/1998 | Voss et al. | 280/277 |
| 5,775,454 | 7/1998 | Scherbarth et al. | 180/219 |

*Primary Examiner*—Brian L. Johnson
*Assistant Examiner*—Deanna Draper
*Attorney, Agent, or Firm*—Birch, Stewart, Kolasch & Birch, LLP

[57] ABSTRACT

To improve the operability of push rods. A link-type front suspension for a front wheel includes forked pipes, push rods, damping devices, upper links, and pivot links. The push rod and the damping device are disposed substantially coaxially with each other in a side view and are rotatably connected to each other. Upper ends of the damping devices and upper ends of the forked pipes are connected by an upper bracket. A top bridge is provided to mount the upper ends of the forked pipes, and a steering stem is provided to mount intermediate portions of the forked pipes. A stem pipe is provided for connecting a rear central portion of the top bridge to a rear central portion of the steering stem and is turnably mounted to a head pipe. A leading end of the pivot arm is connected to an axle. The length of the pivot arm is equal to that of the upper link. The left side upper link extends forwardly from a point connected to the push rod, and the extending end thereof is connected to a mounting portion of a front fender. A fender link, being substantially equal in length to the upper link and parallel thereto, is provided on the right side of the vehicle at a position lower than the upper link. One end of the fender link is connected to the forked pipe. Thus, the upper link, fender link, front fender and forked pipe form an approximately parallelogram link.

7 Claims, 10 Drawing Sheets

FRONT SUSPENSION DEVICE

BACKGROUND OF THE INVENTION

1. Field of the Invention

The present invention relates to a link-type front suspension device for a motorcycle.

2. Description of Background Art

U.S. Pat. No. 4,775,163 discloses a front link-type suspension for a motorcycle. The front link-type suspension has a pair of front forked portions extending on the right and left sides of a front wheel. Pivot links are provided having one-end rotatably mounted on the front forked portions and the other end for supporting an axle of the front wheel. Push rods include one-end rotatably mounted to intermediate portions of the pivot links and the other end connected to damping devices.

The above push rod is connected to a damper spring having an upper end connected to the vehicular body side and to a lower end of a damper. To be more specific, the push rod is rotatably mounted on the damper through a connecting arm in such a manner as not to be coaxial with the damper; and the push rod is directly connected to the damper spring not by way of a seat of the damper or the shaft but in such a manner as to be coaxial with the damper spring.

A front fender is supported by the push rod, to be thus moved together with the push rod.

The push rods are composed of a pair of right and left rod main bodies each extending substantially linearly and a push rod bracket for connecting the rod main bodies to each other. The push rod bracket serves as a portion to be connected to dampers or the like. In general, the rod main bodies and push rod bracket are separately formed and then welded to each other, or formed integrally with each other.

Incidentally, the lower end of the push rod is rotatably connected to the pivot link, and the upper end thereof is rotatably connected to the damper through the connecting arm and is directly connected to the seat of the damper spring. Further, the upper end of the damper is rotatably mounted on a top bridge and the upper end of the damper spring is fixed to the top bridge.

Accordingly, when the push rods are moved up and down by rocking motion of the pivot links caused by vertical motion of a front end, the upper ends of the push rods connected to the dampers and damper springs are liable to be irregularly moved in the longitudinal direction, so that the push rods are applied to bending. This decreases the operability, and also increases the weight because of the need of the increased bending strength, leading to the increased unsprung weight. Accordingly, an object of the present invention is to provide push rods that are excellent in operability.

In the case where the front fender is supported by the push rods and is moved together therewith, since the front fender is not moved with a stroke corresponding to that of the front wheel which is moved up and down, it is required to preset a sufficient clearance between the front wheel and the front fender. Accordingly, another object of the present invention is to reduce such a clearance.

In the case where the rod main bodies and push rod bracket constituting the push rods are separately formed and then welded to each other, these components are generally formed from the same material. In this case, if the components are formed from iron, the total weight thereof is increased, and if they are formed from a light alloy such as an aluminum alloy, the material cost thereof is increased.

Further, if the components are formed integrally with each other, it takes a lot of labor to finish them. Accordingly, a further object of the present invention is to provide push rods having a structure advantageous in manufacture thereof The above front suspension is configured that a top bridge for mounting the front forked portions serves as a member for receiving a load applied to the dampers. While not clearly described in the above document, such a top bridge is generally connected to an upper end of a stem pipe passing through a head pipe of a body frame, and accordingly, upper ends of the damping devices as well as the upper ends of the front forked portions are mounted to the vehicular side by means of the common top bridge.

A structure wherein the top bridge receives a load of the damping devices has a problem in that the top bridge must have a high rigidity for withstanding a large load of the damping devices, and thereby it must be enlarged in size and increased in weight. Another problem is that since the damping devices, front forked portions and stem pipe are supported only by one top bridge, the top bridge is connected to all of the above components and must be removed as a whole for exchanging one of the above components, thereby decreasing the maintenance characteristic.

While similarly not clearly described in the above document, the front forked portions and stem pipe are generally mounted on the top bridge by previously providing, in the top bridge, right and left front forked portion mounting holes and a central stem pipe mounting hole located behind the front forked portion mounting holes. The top bridge, from top to bottom, is mounted to the front forked portions and the stem pipe in such a manner that the upper ends of the front forked portions and the upper end of the stem pipe respectively pass through the front forked portion mounting holes and the stem pipe mounting hole. The top bridge is fixed to the front forked portions and the stem pipe by clamping the front forked portion mounting holes with slits after insertion of the front forked portions in the front forked portion mounting holes and fastening a portion of the stem pipe projecting from the stem pipe mounting hole with a nut.

In the case of the adoption of a slant type in which a stem pipe is slanted with respect to each front forked portion, there occurs a problem in that it is impossible to sequentially assemble parts in the order from bottom to top (for example, to mount a steering stem at intermediate portions of the front forked portions) and to finally mount the top bridge. In other words, the steering stem and top bridge must be fastened prior to mounting of the top bridge, to thereby complicate the assembling procedure.

A portion, mounted on the top bridge side, of the damper is generally elastically supported by a rubber bushing or an annular bushing. However, in this case, since the annular rubber member is used with its circular face located in the horizontal direction, the rubber member has a reduced rubber volume and keeps up with only a motion in the rotational direction. Also, while a thrusting side of the rubber member requires a rubber volume larger than that of the extension side of the rubber member, it is impossible to provide a rubber volume and hardness suitable for the required characteristics to each of the thrusting side and the extension side of the rubber member.

SUMMARY AND OBJECTS OF THE INVENTION

To solve the above problems, according to a first invention, there is provided a link-type front suspension device for a motorcycle including a link-type front suspension having a pair of right and left front forked portions which extend in the vertical direction with a front wheel positioned therebetween and have upper ends steerably connected to a body frame. A pair of right and left push rods are provided substantially in parallel to the front forked portions. A pair of right and left pivot links are provided for rotatably mounting lower ends of the front forked portions and lower ends of the push rods and for rotatably supporting an axle of the front wheel, and damping devices connected between upper ends of the push rods and the front forked portions. The push rods and the damping devices are disposed substantially coaxially with each other in a side view and are rotatably mounted to each other. The right and left front forked portions are connected to the push rods by a pair of right and left upper links provided over the pivot links in such a manner as to be substantially parallel to the pivot links.

According to a second embodiment of the present invention, in addition to the configuration of the first embodiment, each of the upper links extends forwardly from the push rod and the extending end thereof is rotatably mounted to a front fender disposed between the right and left front forked portions, and also the length of the upper link is nearly equal to that of the pivot link.

According to a third embodiment of the present invention, in addition to the configuration of the second embodiment, a fender link extending substantially in parallel to the upper link at a height different from that of the upper link is provided in such a manner that one end thereof is rotatably mounted on the front fender and the other end thereof is rotatably mounted on the front forked portion.

According to a fourth embodiment of the present invention, in addition to the configuration of the first embodiment, the push rods include rod main bodies and a push rod bracket which are formed from different materials, and upper ends of the rod main bodies are fixedly fitted in the push rod bracket.

According to a fifth embodiment of the present invention, in addition to the configuration of the fourth embodiment, the rod main bodies are screwed in the push rod bracket.

According to another embodiment, since the push rods and the damping devices are disposed substantially coaxially with each other and are rotatably connected to each other and the upper links are provided for connecting the front forked portions to the push rods, the push rods are not applied with bending when the front wheel is moved up and down, to be thus smoothly moved up and down. Also, since the push rod, which is not applied with bending, may be designed to simply satisfy required tensile and compressive strengths, it can be reduced in weight. This is effective to reduce the unsprung weight.

Since the front fender is supported by making use of the extension of the upper link, and the upper link and the pivot link are nearly equal to each other and parallel to each other, the front fender is moved with a stroke which substantially corresponds to that of the front wheel. As a result, it is possible to minimize a clearance between the axle and the front fender.

The upper link, fender link substantially parallel to the upper link, front fender, and front fork form an approximately parallelogram link, it is possible to stably support the front fender.

Since the push rods are assembled by fitting the rod main bodies into the push rod bracket of different material from the rod main bodies, they can be reduced in weight by suitably selecting the combination of each material used for the rod main bodies and the push rod bracket. Further, it is possible to improve an external appearance, that is, a commercial value of the push rods by finishing the rod main bodies and the push rod bracket separately from each other.

Since the length of the rod main body is made variable by screwing the rod main body in the push rod bracket. As a result, the front suspension of the present invention is allowed to be commonly used for a plurality of kinds of vehicles different in height. In other words, parts of the front suspension of the present invention are allowed to be commonly used for a plurality of kinds of vehicles different in height.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description To solve the above problems, there is provided a structure for supporting a link-type front suspension for a motorcycle, the link-type front suspension includes: a pair of right and left front forked portions extending in the vertical direction with a front wheel held therebetween. Lower links include one-end rotatably mounted on the front forked portions and the other end for supporting an axle of the front wheel. Push rods include one-end rotatably mounted on intermediate portions of the lower links and the other end connected to damping devices. Upper links are connected between the push rods and the front forked portions wherein a top bridge for mounting the upper ends of the front forked portions and an upper end of a stem pipe is formed separately from an upper bracket for mounting the upper ends of the front forked portions and upper ends of the damping devices.

In addition, an axial line of the front forked portion is distinct as compared to an axial line of the stem pipe. A stem pipe mounting hole is formed in the top bridge and is set to be larger than an outside diameter of the stem pipe and the upper end of the stem pipe is fastened to the top bridge through a collar, whereby when the top bridge is mounted, from top to bottom, to the front forked portions and the stem pipe, the end of the stem pipe and the ends of the front forked portions are simultaneously fitted in the stem pipe mounting hole and the front forked portion mounting holes formed in the top bridge, respectively.

In addition, a mounting shaft is provided on an upper end of each of the damping devices and is allowed to pass through a mounting hole provided in the upper bracket, and is fastened to the upper bracket through a pair of previously divided mount rubbers which are put on upper and lower surfaces of the upper bracket at a position around the mounting hole.

Since the top bridge is formed separately from the upper bracket so that only the upper bracket receives a large load of the damping devices and the top bridge is used only for a steering operation, the top bridge can be reduced in size and weight.

Since the front suspension can be assembled without use of the top bridge until the final assembling step, it is possible to sequentially assemble parts in the order from the bottom to the top and finally mount the top bridge, and hence to make the assembling procedure easy. Further, since the front suspension side and the steering side can be separately exchanged, it is possible to improve the maintenance characteristic and to decrease the size of each unit.

Since the inside diameter of the stem pipe mounting hole is larger than the outside diameter of the stem pipe, even when the top bridge is mounted from the top to the bottom in such a state that the stem pipe is slanted with respect to each front forked portion, it is possible to simultaneously fit the front forked portions and the stem pipe in the front forked portion mounting holes and the stem pipe mounting hole, respectively.

After the stem pipe is fitted in the stem pipe mounting hole, the collar is inserted in the stem pipe mounting hole to eliminate looseness therebetween. Thus, the stem pipe can be mounted on the top bridge by fastening the upper portion of the stem pipe. Accordingly, even in the case of the adoption of the slant type, it is possible to mount the top bridge from the top to the bottom in such a state wherein the front forked portions and the stem pipe are previously fixed by the steering stem, and hence to make the assembling procedure easier.

Since a pair of the mount rubbers are provided on the upper and lower sides of the upper bracket, properties such as a rubber volume, material and hardness of the extension side rubber can be made different from those of the thrusting side rubber. As a result, each of the rubbers can be most suitably designed to satisfy the required characteristics. The mount rubbers also make it possible to function not only in the rotational direction but also in the loading direction, to ensure a large rubber volume in a small space, and to simplify the structure near the top bridge.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention will be described with reference to FIGS. 1 to 3.

Figure 1:
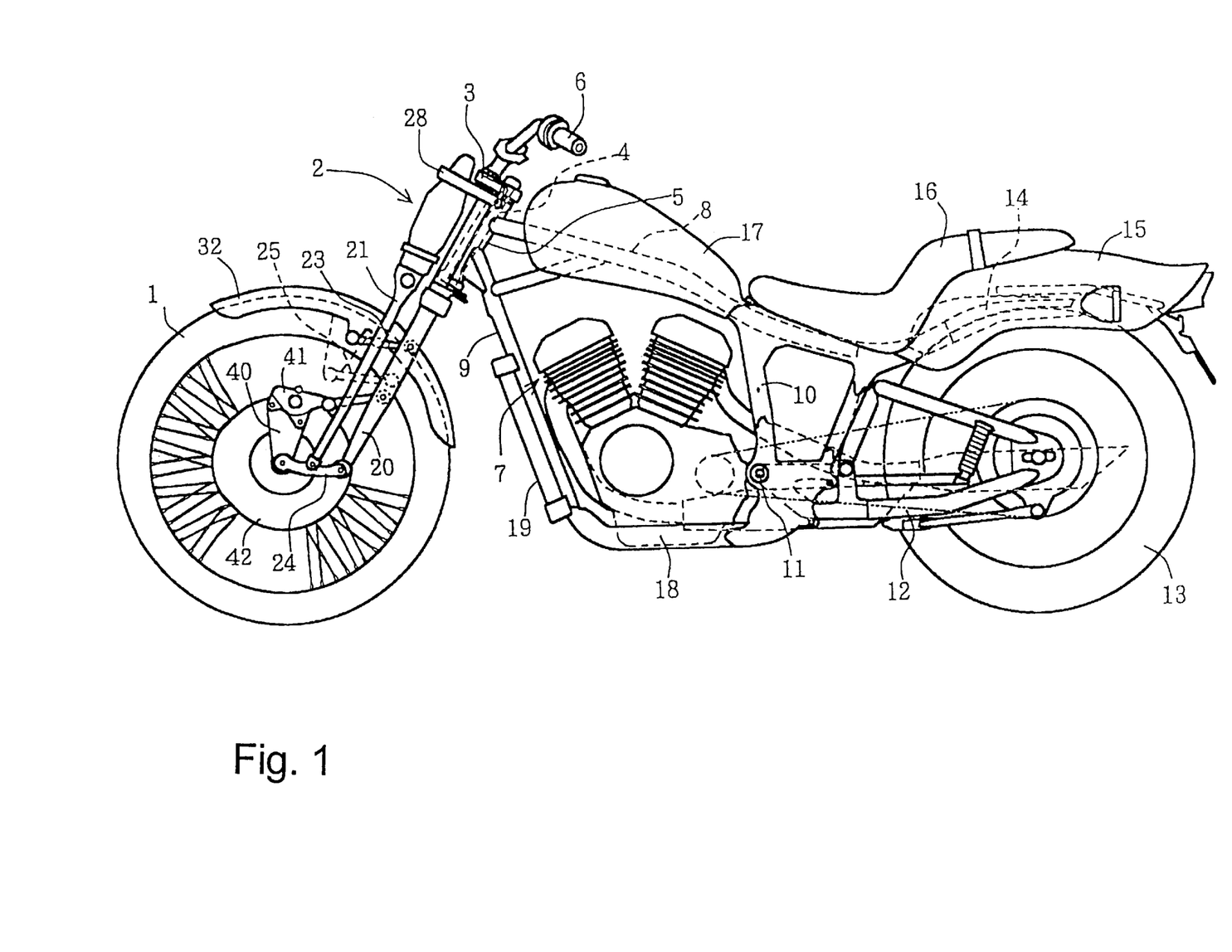
FIG. 1 is a general side view of a motorcycle to which the present invention is applied.

Referring first to FIG. 1, a link-type front suspension 2 for supporting a front wheel 1 is turnably connected to a head pipe 5 by means of a stem pipe 4 through a top bridge 3, to be thus steerable by a handlebar 6.

The head pipe 5 is mounted to a front end of a main pipe 8 which is disposed over a V-type four cycle engine 7 in the longitudinal direction and to a front end of a front down pipe 9 disposed obliquely downwardly in front of the engine 7.

A rear portion of the main pipe 8 is connected to a pair of right and left pivot plates 10 which extend to a greater extent in the vertical direction. Rear swing arms 12 extend rearwardly from the pivot plates 10 with front ends thereof supported by pivot portions 11 of the pivot plates 10. A rear wheel 13 is supported by rear ends of the rear swing arms 12. The rear swing arms 12, which are rockable in the vertical direction around the pivot portions 11, function as a rear suspension.

Seat rails 14 extend rearwardly from a rear portion of the main pipe 8. A rear cowl 15 and a seat 16 are supported on the seat rails 14. A fuel tank 17 is supported on the main pipe 8 in front of the seat 16.

A lower end of the front down pipe 9 is connected to lower ends of the pivot plates 10 through lower frames 18 extending under the engine 7 in the longitudinal direction. A radiator 19 is supported on the front down pipe 9.

Figure 2:
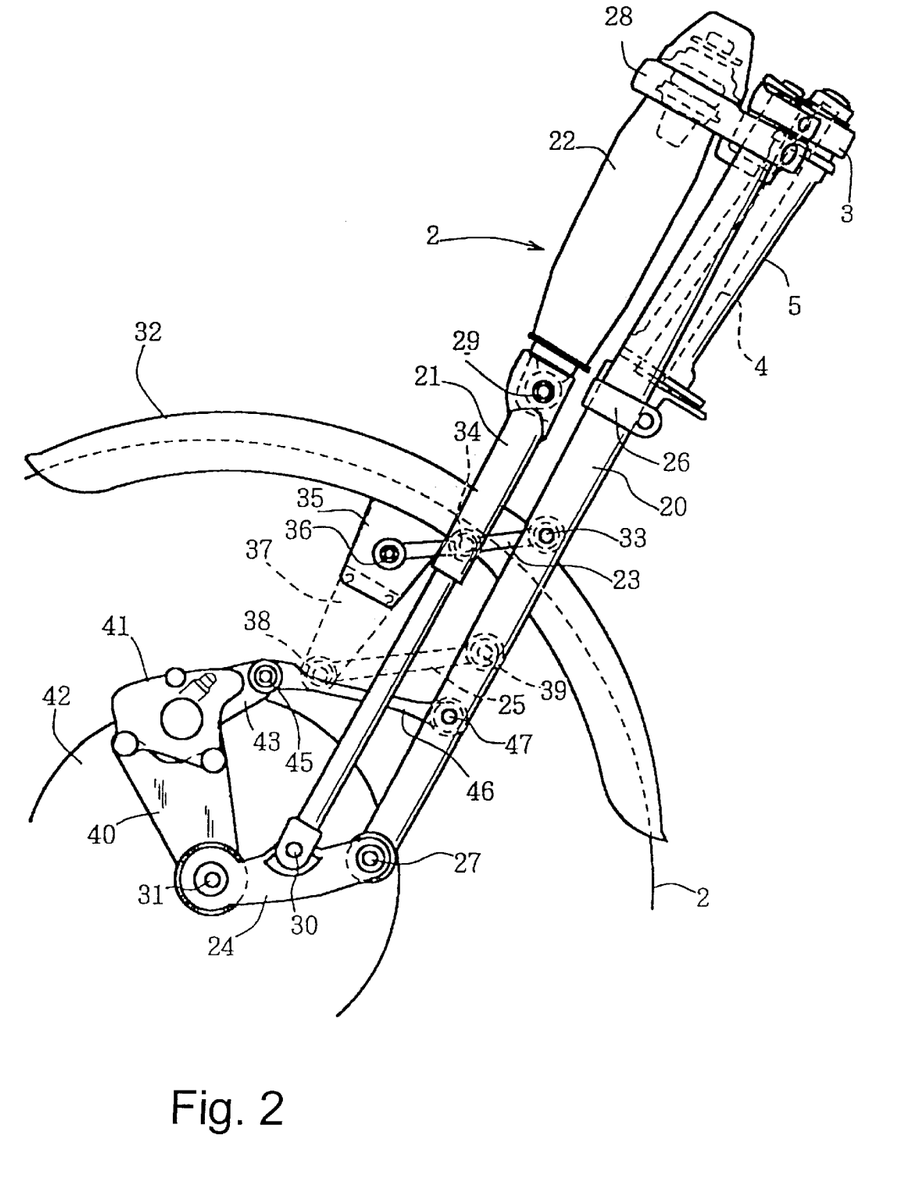
FIG. 2 is an enlarged side view of a link-type front suspension portion.
Figure 3:
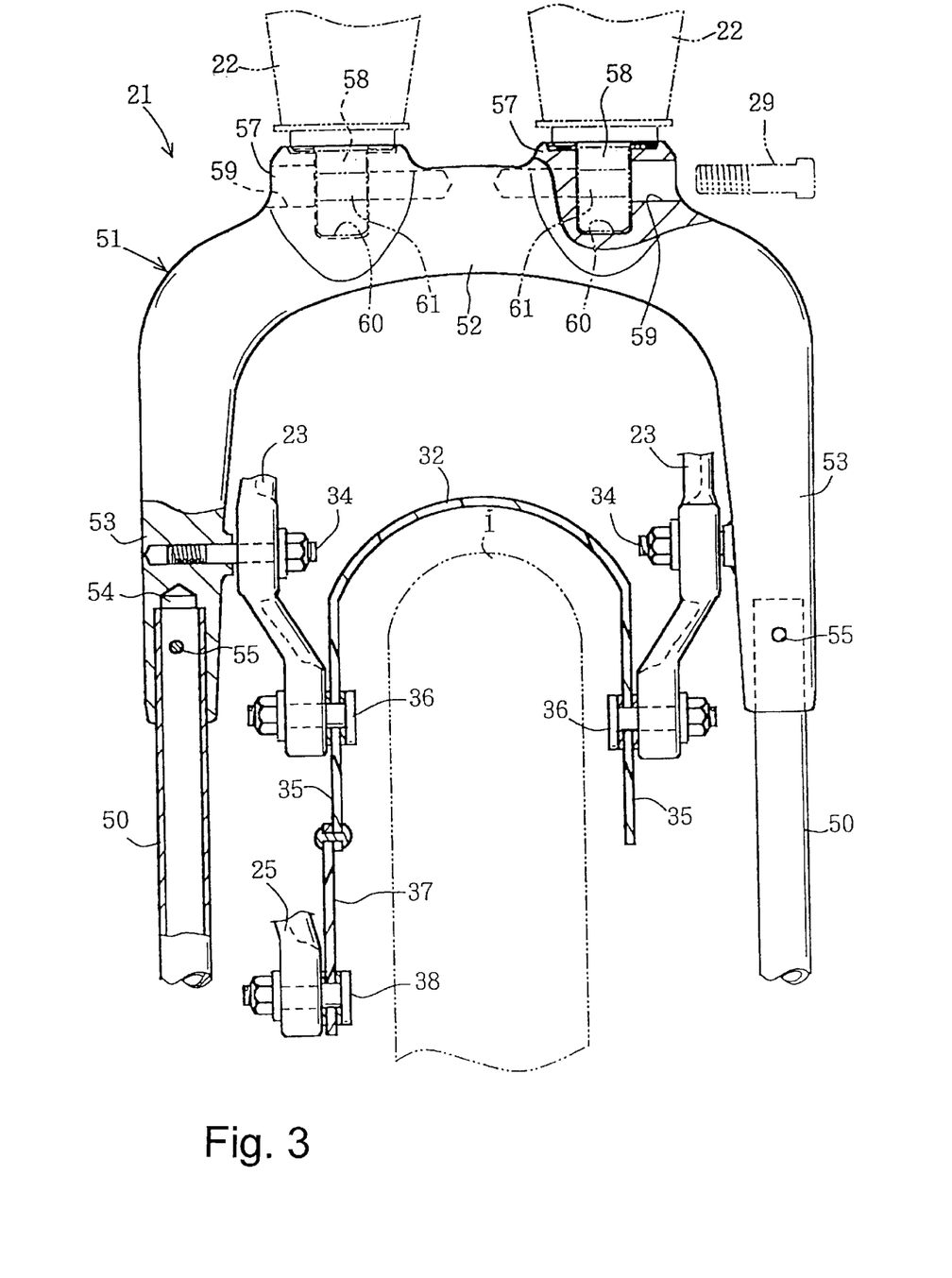
FIG. 3 is a front view of upper portions of push rods.

Referring to FIGS. 2 and 3, the link-type front suspension 2 includes forked pipes 20; push rods 21 and shock absorbers hereinafter referred to as damping devices 22 which are disposed in parallel to the forked pipes 20. Upper links 23 are provided for connecting vertically intermediate portions of the push rods 21 to those of the forked pipes 20. Pivot links 24 are provided for connecting lower ends of the push rods 21 to those of the forked pipes 20. These components 20, 21, 22, 23 and 24 make respective right and left pairs.

The forked pipe 20 disposed on the right side of the vehicular body includes a fender link 25 having one end connected to a vertically-intermediate portion of the forked pipe 20 between the points connected to the upper link 23 and the pivot link 24 and the other end connected to a front fender (which will be described later).

Upper ends of the right and left forked pipes 20 are connected to the top bridge 3 and intermediate portions thereof are connected to a steering stem 26. A central portion of the top bridge 3 is connected to a central portion of the steering stem 26 through the stem pipe 4 which is turnably supported in the head pipe 5.

The forked pipe 20 is a tapered pipe member having such a shape that an upper side from the portion connected to the steering stem 26 is tapered upwardly and a lower side therefrom is similarly tapered downwardly. The forked pipe 20 can be produced by a known method, for example, by swaging a straight pipe member obtained by extrusion into a tapered shape. A lower end of the forked pipe 20 is rotatably mounted on one end of the pivot link 24 through a shaft 27.

The damping device 22 is of a known hydraulic damper type containing a damper spring. An upper end of the damping device 22 is supported by a front portion of an upper bracket 28 and a lower end thereof is rotatably mounted on an upper end of the push rod 21 through a shaft 29.

The push rod 21 is a pipe member extending downwardly substantially in parallel to the forked pipe 20. A lower end of the push rod 21 is rotatably mounted on an intermediate portion of the pivot link 24 through a shaft 30. The other end of the pivot link 24 is rotatably mounted on an axle 31 of the front wheel 1.

The upper links 23 are disposed in the vicinity of a front fender 32 between the right and left forked pipes 20 and between the right and left push rods 21. One end of the upper link 23 is rotatably mounted on the forked pipe 20 through a shaft 33 and an intermediate portion thereof is rotatably mounted on the push rod 21 through a shaft 34. The length of the upper link 23 between the shafts 33 and 34 is nearly equal to the length of the pivot link 24 between the shafts 27 and 31.

The forked pipe 20, push rod 21, upper link 23 and pivot link 24 thus form an approximately parallelogram link mechanism which allows the push rod 21 to be moved substantially in parallel to the forked pipe 20 when the front wheel 1 is moved up and down.

Front ends of the right and left upper links 23 extend to a greater extent forwardly from the push rods 21, and are rotatably mounted through shafts 36 on stays 35 projecting downwardly from the front fender 32.

The fender link 25, which is disposed on the right side of the vehicular body as described above, extends under the mounting position of the upper link 23 substantially in parallel to the upper link 23. One end of the fender link 25 is rotatably mounted through a shaft 38 on a stay 37 which extends to a greater extent downwardly from the stay 35 provided on the right side of the front fender 32, and the other end thereof is rotatably mounted on the forked pipe 20 through a shaft 39.

A line connecting the shaft 36 of the stay 35 to the shaft 38 of the stay 37 is substantially parallel to an axial line of the forked pipe 20. Thus, on the right side of the vehicular body, the upper link 23, fender link 25, stays 35 and 37 of the front fender 32, and forked pipe 20 form an approximately parallelogram link mechanism which allows the front fender 32 to be moved substantially in parallel to the front wheel 1, that is, up and down when the front wheel 1 is moved up and down.

One end of a caliper bracket 40 is turnably mounted around the axle 31, and a caliper 41 is supported on the other end of the caliper bracket 40. Upon braking, the caliper 41 is brought in slide-contact with a brake disk 42, to be thus directly applied with a braking force.

A stay 43 is integrally formed on the caliper 41 in such a manner as to project rearwardly therefrom. One end of a torque link 46 is rotatably mounted on the stay 43 through a shaft 45 and the other end thereof is rotatably mounted on the forked pipe 20 through a shaft 47.

Referring to FIG. 3, the push rods are composed of a pair of right and left rod main bodies 50 and a push rod bracket 51. The rod main body 50 is a pipe made from a suitable metal such as steel, and the push rod bracket 51 is formed into an approximately U-shape in a front view.

The push rod bracket 51 is made from a suitable light alloy such as an aluminum alloy, and has a central bridge portion 52 and a pair of right and left arm-like connecting portions 53 projecting downwardly from right and left ends of the bridge portion 52. Each connecting portion 53 has a fitting hole 54 extending in the axial direction from a lower end thereof An upper end portion of the rod main body 50 is press-fitted in the fitting hole 54 and is fixed thereto with a pin 55.

In addition, an external thread may be formed around the upper end portion of the rod main body 50 and an internal thread may be formed in the fitting hole 54. In this case, the rod main body 50 can be screwed in the fitting hole 54. This is effective not only to eliminate the need for the provision of the pin 55 but also to make the height of the vehicle adjustable. As a result, the front suspension of the present invention is allowed to be commonly used for a plurality of kinds of vehicles which are different in height. In other words, parts of the front suspension of the present invention are allowed to be commonly used for a plurality of kinds of vehicles which are different in height.

The connecting portion 53 has, at a position higher than the fitting hole 54, an internal thread hole 56 extending from the inside of the vehicle in a direction perpendicular to the axial direction of the connecting portion 53. An external thread is formed at one end of a shaft 34 and is screwed in the internal thread hole 56, to be thus mounted thereto.

Bosses 57, spaced from each other in the lateral direction, are formed on an upper portion of the bridge portion 52. Each boss 57 has an insertion hole opened upwardly.

The boss 57 also has a connecting hole 59 extending sidewardly, that is, in a direction perpendicular to the axial direction of the insertion hole 58. To be more specific, the connecting holes 59 are formed in the right and left bosses 57 in such a manner as to be coaxial with each other. Meanwhile, each of the damping devices 22 has a mounting leg 60 at a lower end thereof. Each damping device 22 is thus connected to the bridge portion 52 by inserting the mounting leg 60 in the connecting hole 59, aligning a mounting hole 61 formed in the mounting leg 60 with the connecting hole 59, and screwing an external thread of a shaft 29 in an internal thread of the connecting hole 59.

A function of this embodiment will be described below. In the link-type front suspension 2, the push rod 21 and the damping device 22 are disposed substantially coaxially with each other in a side view and are rotatably connected to each other, and the push rod 21 is supported by a double link mechanism composed of the upper link 23 and the pivot link 24.

Accordingly, when the front wheel 1 is moved up and down, the push rods 21 are moved up and down in such a manner as to be parallel to the forked pipes 20. In this case, the push rods 21 are smoothly moved without the occurrence of any bending because they are turnably connected to the lower ends of the damping devices 22 with the shafts 29, resulting in an improved operability. Further, since the push rod, which is not applied with bending, may be designed to simply satisfy required tensile and compressive strengths, it can be reduced in weight. This is effective to reduce the unsprung weight.

Since the upper link 23, pivot link 24, and fender link 25 are substantially parallel to each other and are also nearly equal in length to each other, the front fender 32 is moved with a stroke which substantially corresponds to that of the axle 31. As a result, it is possible to minimize a clearance between the axle 31 and the front fender 32.

The front fender 32 on the right side of the vehicular body is provided with the stay 37 which projects to a greater extent downwardly from the stay 35 connected to the upper link 23 and one end of the fender link 25 is connected to the stay 37. Consequently, the upper link 23, fender link 25, stay 37 of the front fender 32, and forked pipe 20 form an approximately quadrilateral link capable of preventing rotation of the front fender 32, thereby stably supporting the front fender 32.

Since the fender link 25 is provided only on one side (right side in this embodiment) of the vehicular body, it is possible to reduce the number of parts and the weight, and to be easily disposed without interference with other parts (torque link 46 and the like in this embodiment). It should be noted that the fender links 25 may be provided on the right and left sides depending on the structure near the front wheel.

Since the push rods 21 are assembled by fitting the rod main bodies 50 into the push rod bracket 51 which are made of a different material from the rod main bodies 50, they can be reduced in weight by suitably selecting the combination of materials used for the rod main bodies 50 and the push rod bracket 51, respectively. Further, it is possible to improve an external appearance, that is, a commercial value of the push rods 21 by finishing the rod main bodies 50 and the push rod bracket 51 separately from each other.

Figure 4:
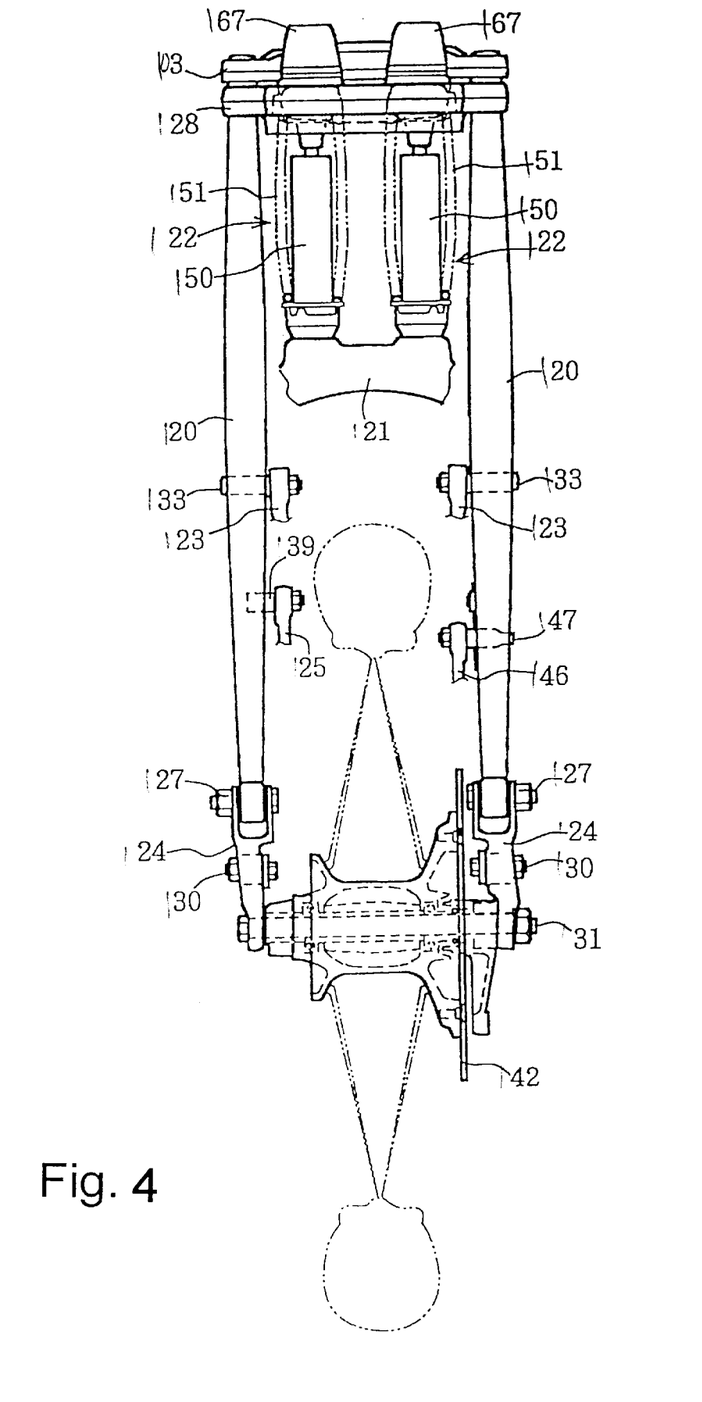
FIG. 4 is a front view of front forked portions.
Figure 5:
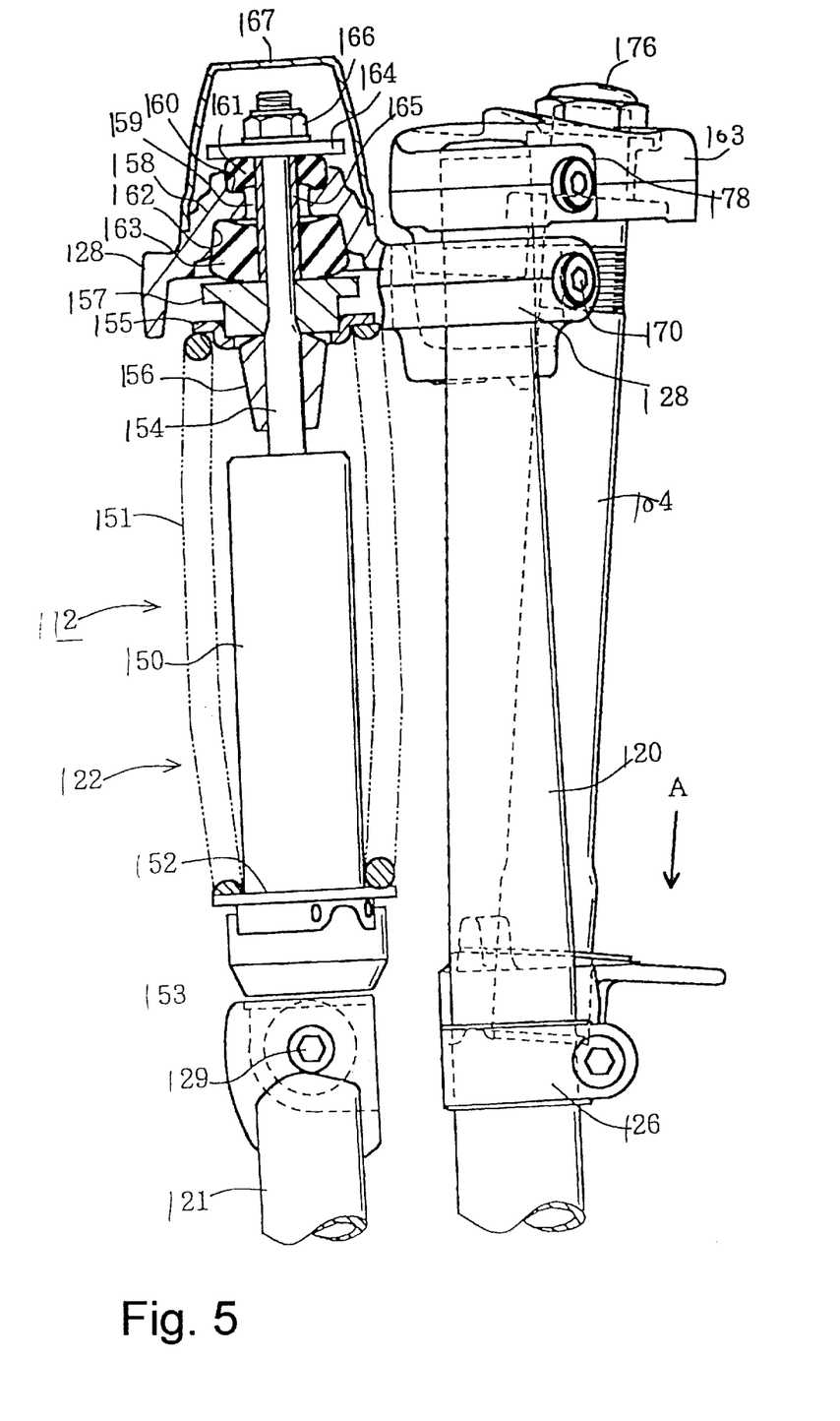
FIG. 5 is a side view, with a portion cutaway, of an upper structure of the front suspension.

Referring to FIGS. 4 and 5, the link-type front suspension includes forked pipes 120; push rods 121 and damping devices 122 which are disposed in parallel to the forked pipes 120. Upper links 123 are provided for connecting vertically-intermediate portions of the push rods 121 to those of the forked pipes 120. Pivot links 124 are provided for connecting lower ends of the push rods 121 to those of the forked pipes 120. The components 120, 121, 122, 123 and 124 make respective right and left pairs.

Referring to FIGS. 4 and 5, the damping device 122 has a damper 150 and a cushion spring 151. A lower end of the cushion spring 151 is in contact with a lower flange 152. An elastically mounting portion 153, which is a lower end of the damping device 122, is mounted on the push rod 121 through a shaft 129.

An upper end of the cushion spring 151 is in contact with an upper flange 155 which is provided around a piston rod 154 in such a manner as to be held between a stopper rubber 156 and a washer 157.

An upper end side of the piston rod 154 projects upwardly through the washer 157, and it further passes through a through-hole 159 formed in a bottom portion of an upward projecting dish-like portion 158 formed integrally with the upper bracket 128.

A small diameter annular recess 160 is formed in an upper surface of the disk-like portion 158 at an area around the through-hole 159. An extension side mount rubber 161 is contained in the annular recess 160.

A large diameter annular recess 162 is formed in a lower surface of the dish-like portion 158 in an area around the through-hole 159. A thrusting side mount rubber 163 having a large diameter is contained in the annular recess 162.

Each of the extension side mount rubber 161 and the thrusting side mount rubber 163 is formed to satisfy required characteristics such as optimum rubber volume, material and hardness. The extension side mount rubber 161 is formed into a shape spherical upward, and the thrusting side mount rubber 163 is formed into a shape spherical projecting downwardly. These mount rubbers 161 and 163 function as a pair of mount rubbers.

The extension side mount rubber 161 is brought in spherical-contact with an upper washer 164, and the thrusting side mount rubber 163 is brought in spherical contact with the washer 157. The piston rod 154 projects upwardly, via a collar 165, through the dish-like portion 158, thrusting side mount rubber 163, extension side mount rubber 161 and upper washer 164, and is elastically supported by the upper bracket 128 by fastening the leading end of the piston rod 154 with a nut 166. In FIG. 4, a cap 67 is illustrated.

Figure 6:
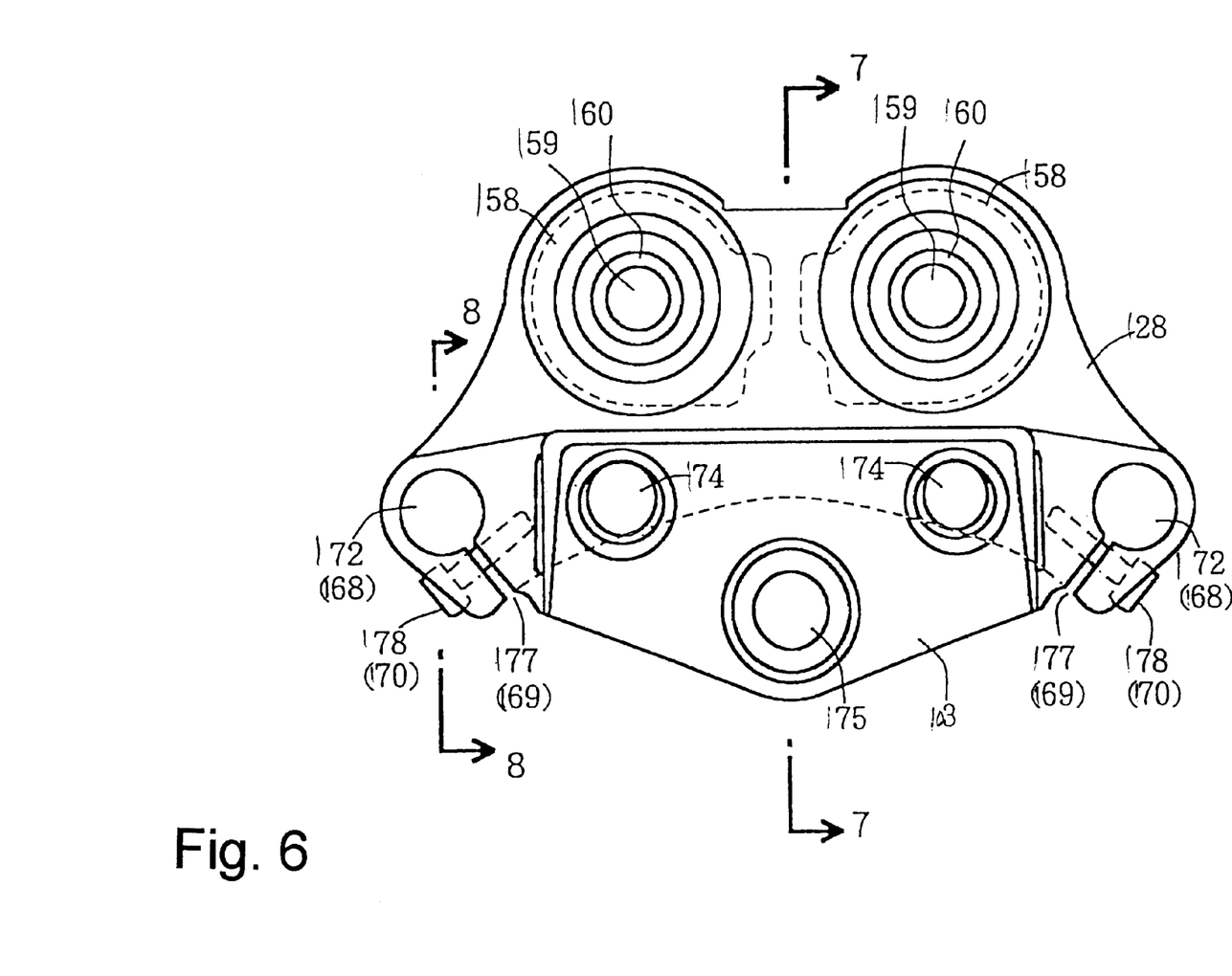
FIG. 6 is a top view of a top bridge and an upper bracket.
Figure 8:
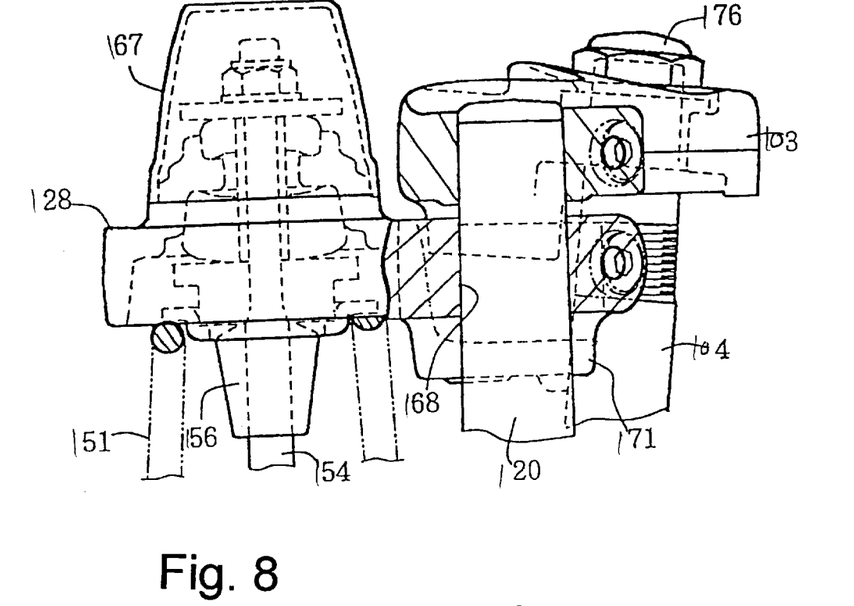
FIG. 8 is a sectional view taken on line 7—7 of FIG. 6.

As is apparent from FIGS. 6 and 8, a portion, overlapped to the top bridge 103, of the upper bracket 128 has right and left through-holes 168. The through-hole 168 has a slit 169. After an upper portion of the front forked pipe 120 passes through the through-hole 168, the through-hole 168 is clamped with a bolt 170 crossing the slit 169. A central portion of the upper bracket 128, located between the right and left through-holes 168, forms a stepped portion 171 recessed downwardly.

A front side of the top bridge 103 is overlapped on a rear portion of the upper bracket 28. The overlapped portion of the top bridge 103 has right and left front forked portion mounting holes 172 coaxial with the through-holes 168. The mounting holes 172 allow the upper ends of the forked pipes 120 to pass therethrough. An intermediate portion of the top bridge 103 between the mounting holes 172 has a pair of right and left mounting holes 174 for mounting handlebar mounting stays 173 (see FIG. 9). A central portion of the rear end portion of the top bridge 103 has a stem pipe mounting hole 175.

An upper end of the stem pipe 104 is fitted in the stem pipe mounting hole 175 and is fastened with a cap nut 176.

Like the case of the upper bracket 128, the front forked portion mounting hole 172 has a slit 177, and is clamped with a bolt 178 crossing the slit 177. Accordingly, the top bridge 103 and the upper bracket 128 are independently fastened to the forked pipes 120 with the bolts 178 and 170.

Figure 7:
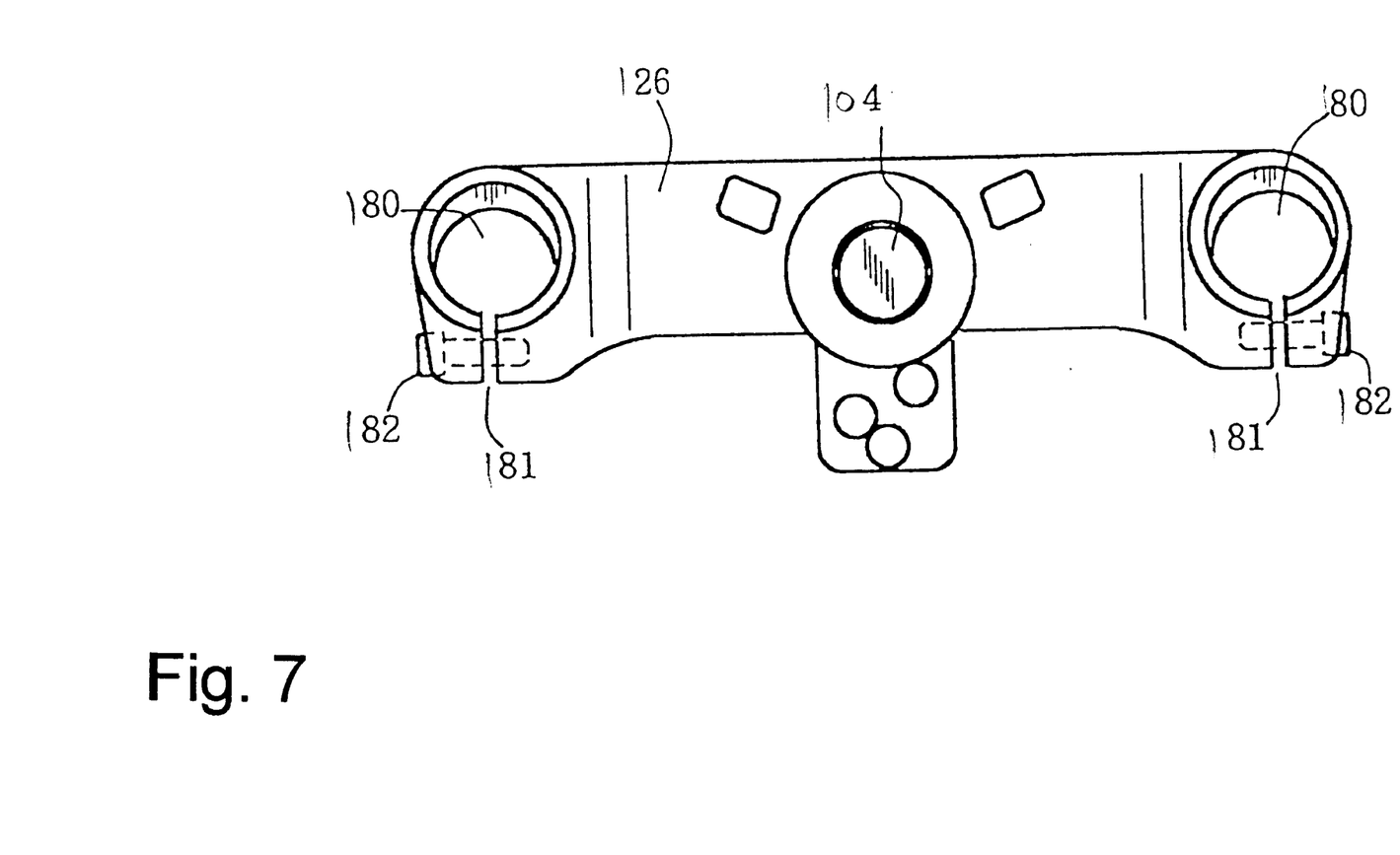
FIG. 7 is a top view of a steering stem (in the direction shown by an arrow A of FIG. 5.)

As shown in FIG. 7, the stem pipe 104 projects upward from a central portion of the steering stem 126. The steering stem 126 has, on the right and left sides of the stem pipe 104, through-holes 180 for allowing the forked pipes 120 to pass therethrough. The forked pipes 120 are fixed in the through-holes 180 by clamping the through-holes 180 with bolts 182 crossing slits 181 of the through-holes 180.

Figure 10:
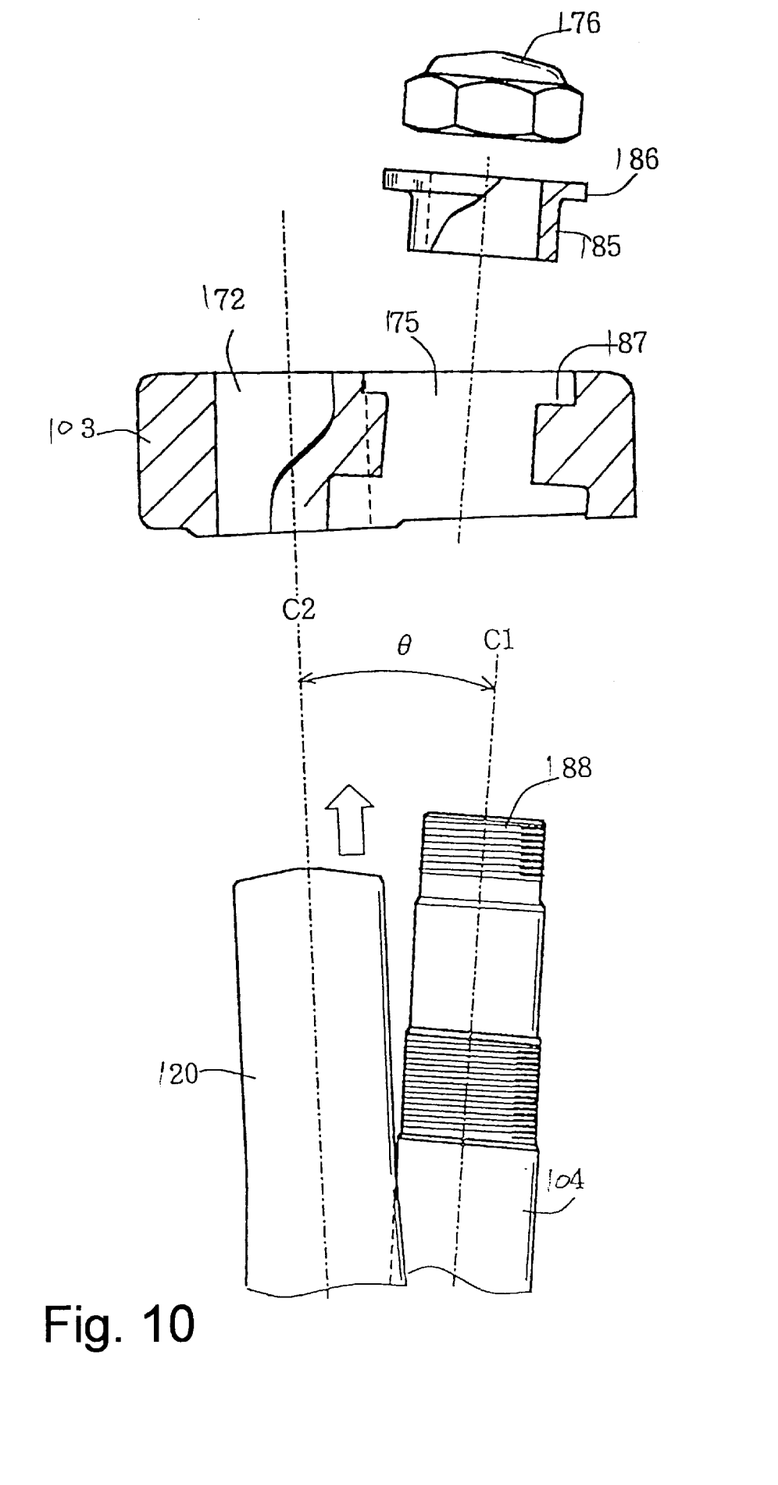
FIG. 10 is a schematic sectional view illustrating a method of mounting the top bridge.

In addition, when the right and left forked pipes 120 are fixed by means of the steering stem 126, as is apparent from FIG. 10, an axial line C1 of the stem pipe 104 is slanted upwardly at a slight angle with respect to an axial line C2 of each forked pipe 120. In this way, the link-type front suspension of the present invention is of a slant type.

As shown in FIGS. 8 and 10, the front forked portion mounting hole 172 of the top bridge 103 is formed along the axial line C2, and it has a diameter allowed to be just fitted with the outer periphery of the forked pipe 120.

Figure 9:
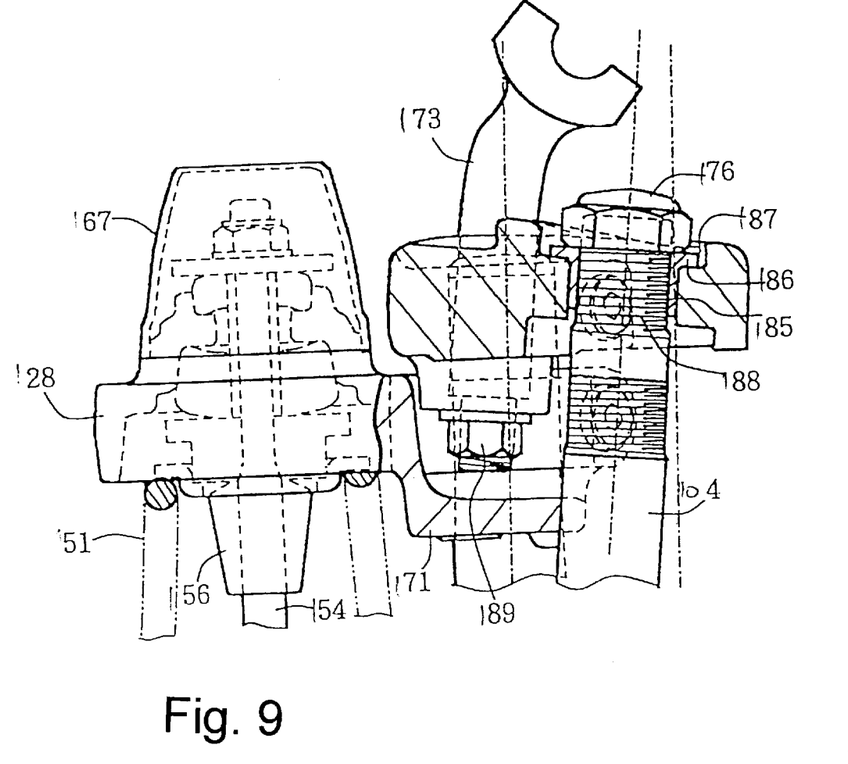
FIG. 9 is a sectional view taken on line 8—8 of FIG. 6.

On the other hand, as shown in FIGS. 9 and 10, the stem pipe mounting hole 175 is formed along the axial line C1, and it has a diameter larger than the outer periphery of the stem pipe 104 for allowing the stem pipe 104 to be inserted in the stem pipe mounting hole 175 simultaneously with insertion of the forked pipes 120 in the front forked portion mounting holes 172.

A flanged collar 185 is fitted in a gap thus caused between the steering stem 104 and the stem pipe mounting hole 175. A flange 186 of the collar 185 is supported by a bottom portion of an annular recess 187 formed around the stem pipe mounting hole 175. An external thread 188 is formed at an upper end of the stem pipe 104.

As illustrated in FIG. 9, a nut 189 is provided for fastening a lower end of a handle bar mounting stay 173 from bottom to top by making use of a space formed by the stepped portion 171 of the upper bracket 128.

A function of this embodiment will be described below. The upper supporting structure of the link-type front suspension device can be reduced in size and weight because the top bridge 103 is formed separately from the upper bracket 128 so that only the upper bracket 128 receives a large load of the damping devices 122 and the top bridge 103 is used only for steering operation.

Since the front suspension can be assembled without use of the top bridge 103 until the final assembling step, it is possible to sequentially assemble the parts in the order from bottom to top and finally mount the top bridge 103, and hence to make it easy for the assembling procedure. Further, since the front suspension side and the steering side can be separately exchanged, it is possible to improve the maintenance characteristic and to reduce the size of each unit.

Since the inside diameter of the stem pipe mounting hole 175 is larger than the outside diameter of the stem pipe 104, when the top bridge 103 is mounted, from top to bottom, in a state in which the stem pipe 104 is slanted with respect to the forked pipes 120, the fork pipes 120 and the stem pipe 104 can be simultaneously fitted in the front forked portion mounting holes 172 and the stem pipe mounting hole 175, respectively.

After the stem pipe 104 is fitted in the stem pipe mounting hole 175, the flanged collar 185 is inserted in the stem pipe mounting hole 175 to eliminate looseness therebetween. Thus, the stem pipe 104 can be mounted on the top bridge 103 by fastening the thread 188 formed at the upper end of the stem pipe 104 with the cap nut 176. Accordingly, even in the case of the adoption of the slant type, and even if the forked pipes 120 and the stem pipe 104 are previously fixed by the steering stem 126 in such a manner that the stem pipe 104 is slant with respect to each forked pipe 120, it is possible to mount the top bridge 103, from top to bottom, to the forked pipes 120 and the stem pipe 104 and hence to make it easy for the assembling procedure.

Since a pair of the vertically-divided mount rubbers 161 and 163 are provided on the upper and lower sides of the upper bracket 128 at a position around each through-hole 159, properties such as a rubber volume, material and hardness of the extension side rubber 161 can be made different from those of the thrusting side rubber 163. As a result, each of the rubbers 161 and 163 can be most suitably designed to satisfy the required characteristics. The mount rubbers 61 and 63 also make it possible to function not only in the rotational direction but also in the loading direction, to ensure a large rubber volume in a small space, and to simplify the structure near the top bridge 103.

Figure 11:
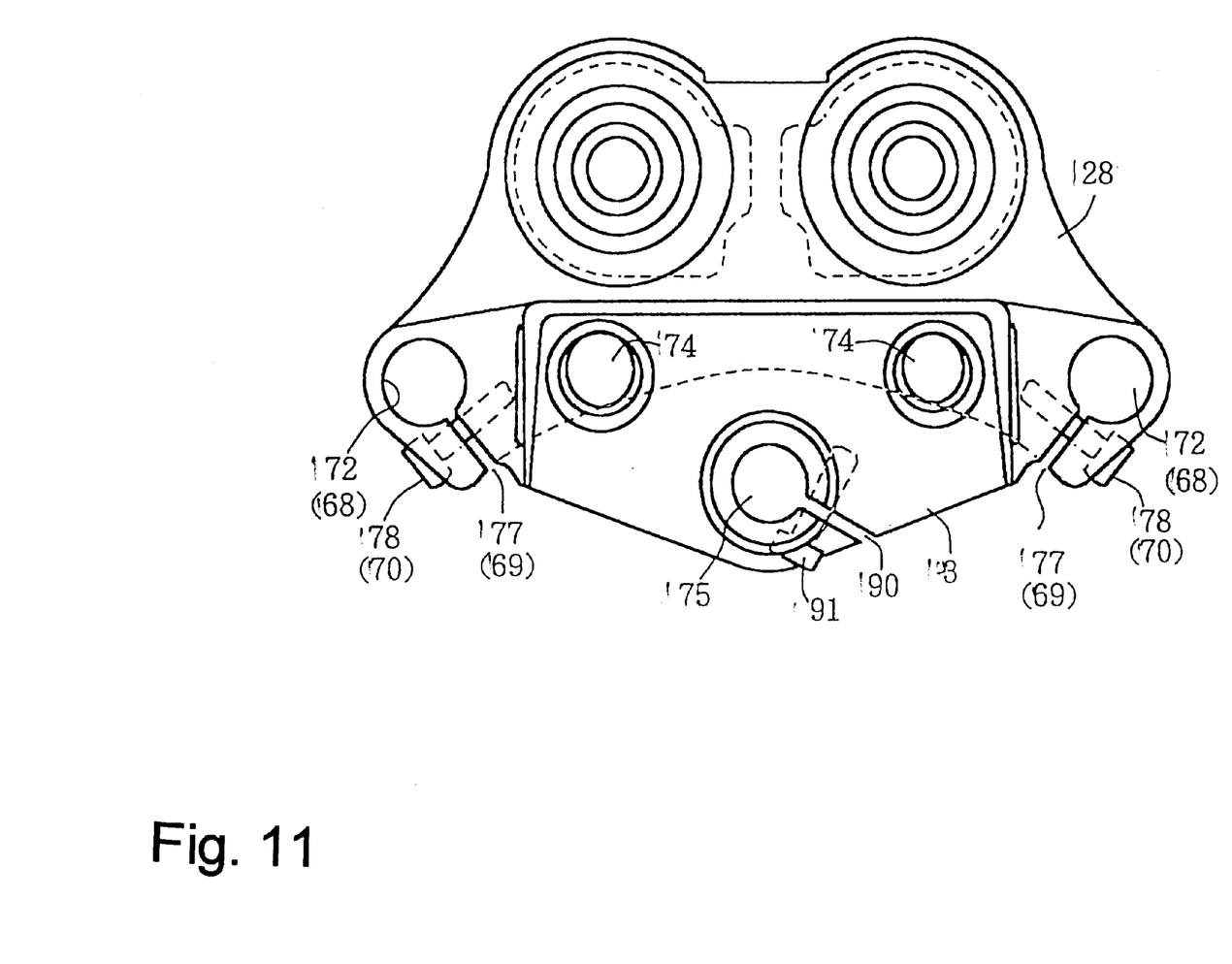
FIG. 11 is a view, similar to FIG. 7, showing another embodiment.

FIG. 11 illustrates another embodiment modified from the previous embodiment in terms of mounting of the stem pipe 104 on the top bridge 103. In this embodiment, a slit 190 is formed around the stem pipe mounting hole 175. After the stem pipe 104 is inserted in the stem pipe mounting hole 175, the stem pipe mounting hole 175 is clamped with a bolt 191 crossing the slit 190. With this configuration, it is possible to eliminate the need of provision of the cap nut 176.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a link-type front suspension device for a motorcycle including a link-type front suspension having a pair of right and left front forked portions extending in the vertical direction with a front wheel positioned therebetween and having upper ends steerably connected to a body frame, a pair right and left push rods provided substantially in parallel to said front forked portions, a pair of right and left pivot links for rotatably mounting lower ends of said front forked portions and lower ends of said push rods and for rotatably supporting an axle of the front wheel, and damping devices connected between upper ends of said push rods and said front forked portions, the improvement comprising:

said push rods and said damping devices are disposed substantially coaxially with each other in a side view and are rotatably mounted relative to each other; and said front forked portions are connected to said push rods by a pair of right and left upper links operatively connected to said pivot links to be substantially parallel to said pivot links, wherein said push rods include rod main bodies and a push rod bracket which are formed from different materials, and upper ends of said rod main bodies are secured in said push rod bracket.

2. The link-type front suspension device according to claim 1, wherein each of said upper links extends forwardly from said push rod and the extended end thereof is rotatably mounted to a front fender disposed between said right and left front forked portions, with the length of said upper link being nearly equal to that of said pivot link.

3. The link-type front suspension device according to claim 2, wherein a fender link extends substantially in parallel to said upper link at a height different from that of said upper link and is operatively connected wherein one end thereof is mounted on said front forked rotatably mounted on said front fender and the other end thereof is rotatably portion.

4. The link-type front suspension device according to claim 1, wherein said rod main bodies are screwed in said push rod bracket.

5. In a structure for supporting a link-type front suspension for a motorcycle, said link-type front suspension including: a pair of right and left front forked portions extending in the vertical direction with a front wheel held therebetween; lower links having one-end rotatably mounted on said front forked portions and the other end for supporting an axle of the front wheel; push rods having one-end rotatably mounted on intermediate portions of said lower links and the other end connected to damping devices; and upper links connected between said push rods and said front forked portions; the improvement comprising:

a top bridge for mounting upper ends of said front forked portions and an upper end of a stem pipe is formed separately from an upper bracket for mounting the upper ends of said front forked portions and upper ends of said damping devices.

6. The structure for supporting a link-type front suspension according to claim 5, wherein an axial line of said front forked portion is different from an axial line of said stem pipe; and a stem pipe mounting hole formed in said top bridge is set to be larger than an outside diameter of said stem pipe and the upper end of said stem pipe is fastened to said top bridge through a collar, whereby when said top bridge is mounted, from top to bottom, to said front forked portions and said stem pipe, the end of said stem pipe and the ends of said front forked portions are simultaneously fitted in said stem pipe mounting hole and front forked portion mounting holes formed in said top bridge, respectively.

7. The structure for supporting a link-type front suspension according to claim 5, wherein a mounting shaft provided on an upper end of each of said damping devices passes through a mounting hole provided in said upper bracket, and is fastened to said upper bracket through a pair of previously divided mount rubbers which are put on upper and lower surfaces of said upper bracket at a position around the mounting hole.

* * * * *